(No Model.)
A. VICK.
Velocipede.
No. 228,496. Patented June 8, 1880.
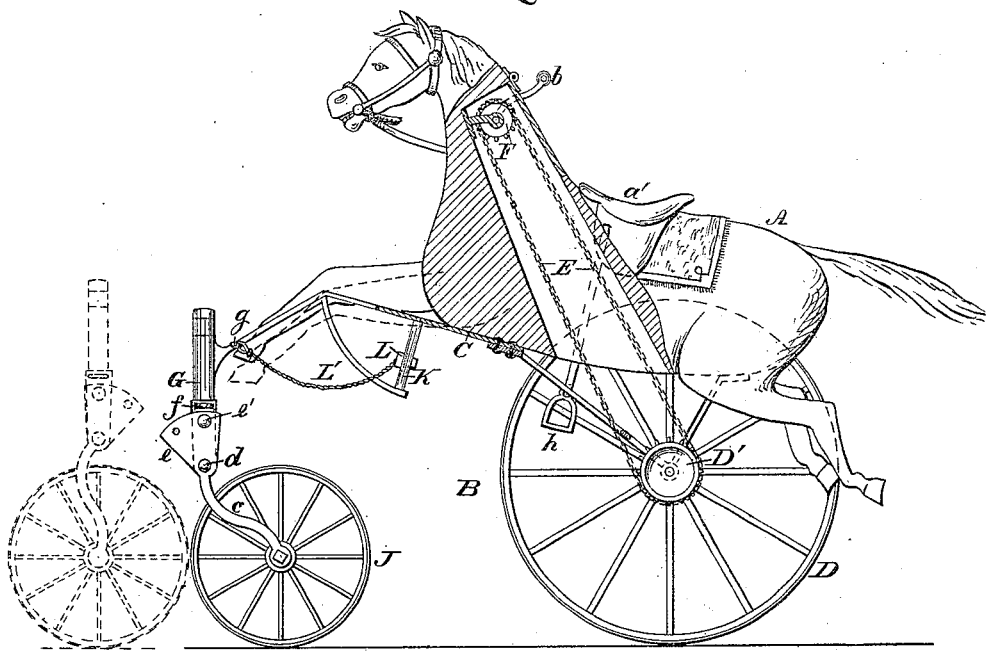
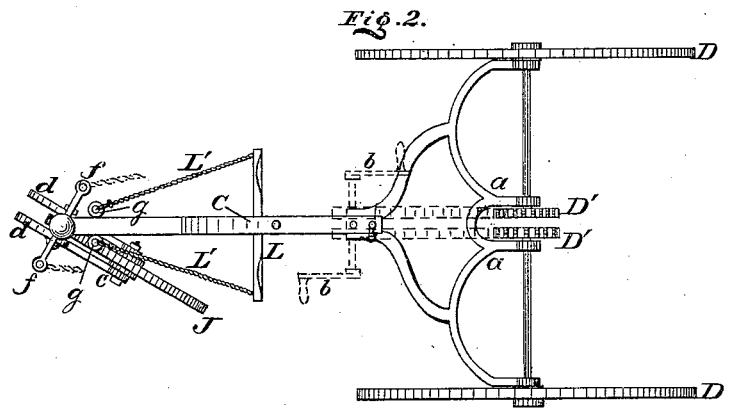
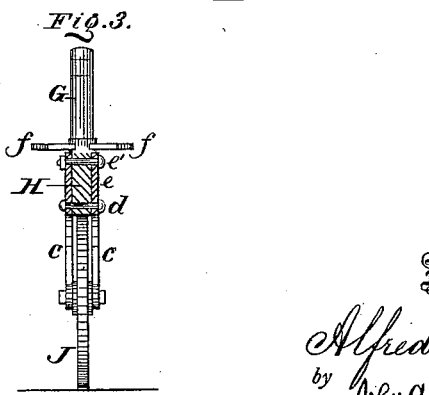
Witnesses:
A. P. Grant
W. F. Kircher
Inventor:
Alfred Vick,
by John A. Wiedersheim
ATTORNEY.

UNITED STATES PATENT OFFICE.

ALFRED VICK, OF MOUNT CARMEL, CONNECTICUT, ASSIGNOR OF ONE-HALF OF HIS RIGHT TO THEODORE J. HARBACH, OF PHILADELPHIA, PA.

VELOCIPEDE.

SPECIFICATION forming part of Letters Patent No. 228,496, dated June 8, 1880.

Application filed April 7, 1880. (No model.)

*To all whom it may concern:*

Be it known that I, ALFRED VICK, a citizen of the United States, residing at Mount Carmel, in the county of New Haven, State of Connecticut, have invented a new and useful Improvement in Hobby-Velocipedes, which improvement is fully set forth in the following specification and accompanying drawings, in which—

Figure 1 is a side elevation, partly sectional, of the velocipede embodying my invention. Fig. 2 is a top or plan view of the running-gear. Fig. 3 is a front view, partly sectional, of the pilot or caster wheel.

Similar letters of reference indicate corresponding parts in the several figures.

My invention consists of a velocipede which may be steered by the feet or hand, the construction and operation being hereinafter fully described.

It also consists of a vertical adjustable tiller.

It also consists of a wheel adapted to serve as a pilot or post wheel and caster-wheel.

Referring to the drawings, A represents the body of the velocipede, which may be in the form of a horse or other animal, a carriage-body, chair, &c.; and B, the running-gear, to the reach C of which the body is connected, and by which it is supported on said gear B.

The hind wheels, D, are mounted independent of each other on bearings $a\,a$, and the axle of each of the wheels has secured to it a spur-wheel, D′, around which passes a chain, E, which also passes around a spur-wheel, F, mounted at or near the upper end of the body A, which in the present case, being in the form of an animal, is hollowed out, to permit the passage of the two chains E and receive the two spur-wheels F F, the shafts of the latter being supported on the inner wall of the body, and each provided with a crank, $b$, which is located at the side of the head of the animal, so that the two cranks may be readily grasped and operated by the rider, who occupies the saddle or seat $a'$ of the body A.

Secured to the front end of the reach C is a boss or tubular bearing, G, in which is fitted the turning-post H of the front wheel, J, the standards or side arms, $c$, whereof are pivoted, as at $d$, to the lower end of said post, and have at their upper ends enlarged segmental or spreading pieces $e$, which are perforated for the passage of a bolt, $e'$, which rigidly connects the wheel and post.

Projecting from the post H is a horizontal bar, (or bars,) $f$, and depending from the reach C or body A is a post, K, on which is fitted a pedal, L, which is connected by chains or cords L′ with the bar $f$, said chains or cords being also adapted to be detached from the pedal L and attached to eyes $g$ on the reach C, said pedal L sliding on the post K, so as to be vertically adjustable relatively to the requirements of the rider, a set-screw passing through the pedal and tightening against the post for holding the pedal in its adjusted position.

The body A will be provided with foot-rests or stirrups $h$, and the reach C is preferably formed of spring metal to render the riding easy and comfortable.

The operation is as follows: The rider occupies the seat $a'$ and rotates the cranks $b$, whereby, by means of the chains E, power is communicated to the hind wheels, D, which thus propel the vehicle. When it is desired to steer by the feet the pedal L is connected to the bar or bars $f$ by means of the cords or chains L′, and thus by moving said bar or bars the wheel J may be turned to the right or left, it being noticed that the axle of said wheel occupies a position in a right line with the vertical direction of the post H. (See dotted lines, Fig. 1.) Should it be desired to steer by the hands through the medium of the hind wheels, the bolt $e'$ is withdrawn, the wheel J turned on the pivot $d$ until it is out of center with the post H, and the bolt $e'$ inserted in the respective openings in the pieces $e$ and post H, the wheel J thus becoming a caster-wheel. The connections L′ are then detached from the bar or bars $f$ and attached to the eyes $g$. As the two hind wheels, D, are independent of each other, each may be rotated as desired, and thus provide means both for propelling and steering, the caster-wheel swinging around with the steering motions of the hind wheels and permitting the feet to be free to rest on the pedal L as a rest or set in the stirrups $h$.

Having thus described my invention, what I claim as new, and desire to secure by Letters Patent, is—

1. The pedal L, with connections L', the front wheel, J, with bar or bars *f*, and the reach C, with eyes *g*, combined and operating substantially as and for the purpose set forth.

2. The body A, in combination with the front wheel, J, the depending post K, and the pedal L, adjustably fitted to said post K, substantially as and for the purpose set forth.

3. The body A, in combination with the wheel J, convertible into a post or pilot and caster wheel, substantially as and for the purpose set forth.

4. The body A, in combination with the wheel J, having turning post or axis H, the side standards, *c*, having spreading pieces *e*, and the bolt *e'*, substantially as and for the purpose set forth.

5. The body A, with reach C, connected to the running-gear B, the hind wheels, D, whereof are mounted independent of each other, the operating-chain E, passing through the body A, the spur-wheels F, mounted on the body A independent of each other, and provided with cranks *b*, and the convertible front wheel, J, all combined and operating substantially as and for the purpose set forth.

ALFRED VICK.

Witnesses:
JOHN A. WIEDERSHEIM,
A. P. GRANT.